Feb. 24, 1948. C. E. SWENSON 2,436,681
VEHICLE
Filed Dec. 8, 1943
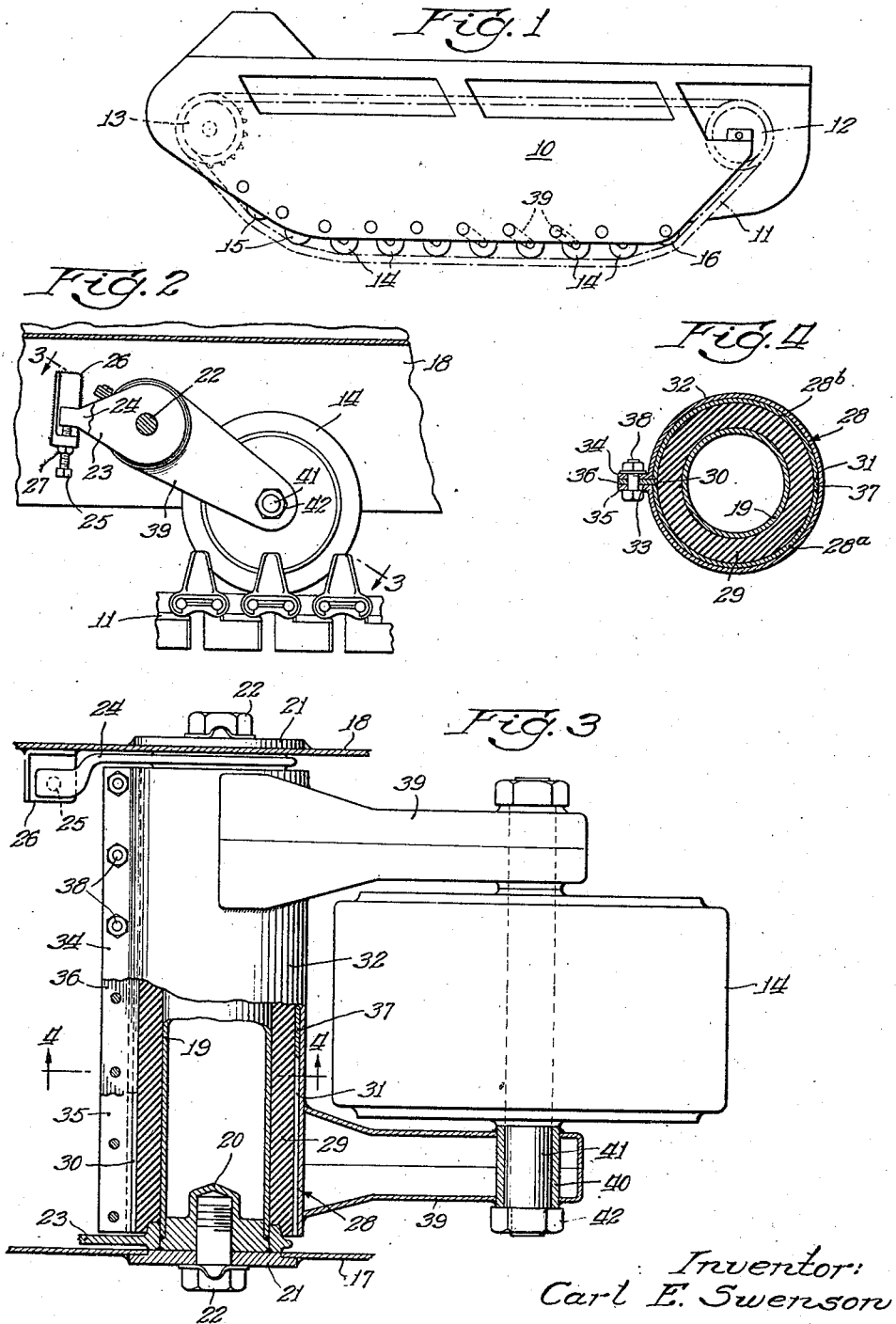
Inventor:
Carl E. Swenson
By Edward C. Fairbaugh
Atty.

Patented Feb. 24, 1948

2,436,681

UNITED STATES PATENT OFFICE 2,436,681

VEHICLE

Carl E. Swenson, Rockford, Ill., assignor, by mesne assignments, to the United States of America, as represented by the Secretary of the Navy Application December 8, 1943, Serial No. 513,430

5 Claims. (Cl. 267—21)

My invention relates to wheeled vehicles and more particularly to vehicles each of which comprises a pair of tracks on opposite sides and bogie or supporting wheels running on the tracks, with the wheels having swinging and yielding connections with the body of the vehicle for supporting the vehicle body with respect to the tracks. My invention relates still more particularly to the swinging and yielding mountings for the supporting wheels of such a vehicle.

There is disclosed in a co-pending application of Benjamin A. Swennes, Serial No. 508,304, filed October 30, 1943, an amphibian vehicle of this type having propelling tracks on opposite sides which are supported with respect to the vehicle body by bogie wheels swingingly and yieldingly connected with the vehicle body. It has heretofore been common practice in such a vehicle to mount the individual wheels between pairs of cast iron supporting arms swingingly and yieldingly connected with the vehicle body. Such a construction, however, was found to be quite heavy for use in an amphibian vehicle in which the weight must be kept to a minimum in order that a maximum amount of cargo may be transported by the vehicle. It is therefore an object of my invention to provide a bogie wheel arm structure which is materially lighter than the prior cast metal arm construction, and to this end it is an object to provide a bogie wheel arm structure which is of sheet metal construction.

Individual bogie wheels in vehicles of this type have heretofore been yieldingly and swingingly mounted with respect to the vehicle body by means of a rubber torsion member disposed between and fixed to concentric metal cylinders, and it is an object of my invention to provide an improved construction for connecting such an assembly with a bogie wheel which is made up principally of sheet metal parts pressed into proper shape as distinguished from metal castings machined to proper shape, and which thus is simple and economical to make.

The torsion member of yielding material in a swinging and yielding bogie wheel mounting of this type is preferably held compressed between the two cylinders to which the torsion member is fixed, and it is an object of my invention to provide an improved mounting of this type which may be easily assembled. To this end it is an object to provide longitudinal splits in the outer one of the two cylinders and a third cylinder to which the supporting arms for a bogie wheel are fixed which is also split and is provided with flanges on its open ends whereby the assembly of the first two cylinders and the torsion member therebetween may be placed in the third cylinder and the latter cylinder may be contracted by bolts passing through its flanges to thereby contract the second cylinder and compress the torsion member.

In such a swinging and yielding bogie wheel connection comprising the three concentric cylinders, it is necessary that the outer two cylinders be fixed together, and it is an object to provide an improved construction for fixing these cylinders together. To this end it is an object to provide a key between the flanges on the open ends of the outermost of the cylinders and extending into a split in the outermost of the two cylinders between which the torsion member is disposed. It is contemplated that the bolts passing through the flanges may also pass through the key and function to hold it in place.

It is a further object of my invention to provide means for supporting the torsion member by the vehicle body in such a manner that said member may be easily and quickly mounted or demounted for repair or replacement. To this end there are provided counterbored end members secured in the open ends of the inner cylinder and a pair of threaded bolts or axles each of which bolts is first passed through a wall section of the vehicle body and then inserted and secured in the end members of the inner cylinder. Since there are only two bolts required to support the torsion member with respect to the body of the vehicle, it is obvious that rapid mounting or dismounting of said member is possible.

The invention consists of the novel constructions, arrangements and devices to be hereinafter described and claimed for carrying out the above stated objects and such other objects as will appear from the following description of a certain preferred embodiment, illustrated in the accompanying drawing, wherein:

Fig. 1 is a side elevational view of a tracked amphibian vehicle embodying the principles of the invention;

Fig. 2 is a side elevational view on an enlarged scale of one of the bogie wheels of the vehicle running on one of the tracks and the suspension mechanism for the bogie wheel;

Fig. 3 is a sectional view on an enlarged scale taken on line 3—3 of Fig. 2; and Fig. 4 is a sectional view taken on line 4—4 of Fig. 3.

Like characters of reference designate like parts in the several views.

The vehicle illustrated in Fig. 1 of the drawing comprises a vehicle body 10 having a pair of articulated vehicle propelling tracks 11 movably disposed on opposite sides of the vehicle (one side only of the vehicle being illustrated). Each of the tracks 11 is held in looped configuration by means of wheels 12 and 13 adjacent the rear and front of the vehicle respectively, bogie wheels 14 for supporting the body 10 with respect to the track, bogie wheels 15 at the front of the vehicle for cushioning the body 10 from jolts due to bumps or sudden rises in the terrain, and an idler wheel 16 at the rear of the vehicle. The wheel 12 may constitute an idler wheel, and the wheel 13 may be a sprocket for engaging with the articulated track for driving the track. The body 10 is preferably water-tight so that the vehicle may function as a boat, and the tracks 11 are preferably of such construction that they may drive the vehicle either through the water or over land. The details of the mechanism for driving the wheels 13 on opposite sides of the vehicle and other details of the vehicle may be such as are disclosed in a similar vehicle in the co-pending application of Benjamin A. Swennes, Serial No. 508,304, hereinbefore mentioned.

Each of the bogie wheels 14 and 15 is swingingly and yieldingly connected with the body 10 of the vehicle. The swinging and yielding suspensions for all of the bogie wheels 14 are the same, and details of the yielding suspension for one of the wheels 14 are shown in Figs. 2, 3 and 4 of the drawing, reference to which will now be made. The vehicle body 10 on each side thereof comprises sheet metal wall portions 17 and 18 as shown in these figures. An inner cylinder 19 of sheet metal is pivotally supported between the wall portions 17 and 18 by means of an end member 20 fitting in the cylinder on each end thereof and fixed to the cylinder, a circular plate 21 disposed in an appropriate opening in each of the wall portions 17 and 18 and fixed thereto, and a bolt 22 extending through a central opening in each of the plates 21 so as to be journalled therein and screwed into the adjacent end member 20.

Although the cylinder 19 is pivotally mounted with respect to the wall portions 17 and 18 of the body 10, it is generally held against pivotal movement and is only moved for purposes of adjustment. The cylinder 19 is adjustably anchored from pivotal movement with respect to the body 10 and wall portions 17 and 18 by means of reaction arms 23 and 24 which are fixed on the ends of the cylinder. Each of the reaction arms is held against movement with respect to the adjacent wall portion by means of a screw 25 extending through an anchor member 26 fixed to the adjacent wall portion. The screws 25 are adjustable in the anchor members 26 for adjusting the positions of the reaction arms 23 and 24 and thereby of the cylinder 19, and each of the screws 25 is provided with a lock nut 27 for holding the screw 25 against undesired rotative movement.

A second or intermediate sheet metal cylinder 28 is disposed concentrically with the cylinder 19, and a torsion member 29 of rubber is disposed between the cylinders and is fixed to each of the cylinders as by vulcanizing. The cylinder 28 is formed by two portions 28a and 28b which are each substantially a half cylinder and which provide between their open ends a pair of splits or slots 30 and 31 extending longitudinally of the cylinder 28 as a whole. An outer cylinder 32 of sheet metal is disposed to fit over the intermediate cylinder 28. The cylinder 32 is provided with a longitudinally extending split or slot 33 and flanges 34 and 35 on its open ends as shown. A key 36 is disposed in the split 33 and between the flanges 34 and 35, and the key extends into the split 30 in the cylinder 28 to thereby fix the cylinders 28 and 32 against relative rotation. A spacer member 37 is provided in the split 31 in the cylinder 28 for substantially closing the split. A plurality of bolts 38 extends through appropriate openings in the flanges 34 and 35 and key 36, and the bolts function to hold the cylinder 32 tightly fitting on the cylinder 28 with the rubber torsion member 29 in compression between the cylinders 19 and 28.

Two bogie wheel supporting arms 39 are fixed to the outer cylinder 32. Each of these arms is constructed of sheet metal, and, although having considerable strength, the arm nevertheless is quite light in weight. Each of the arms 39 is provided with a sleeve 40 fixed therein, and a shaft 41 extends through the sleeves in each of the arms and between the arms. A bogie wheel 14 is rotatably disposed with respect to the shaft 41 and is positioned between the arms 39. The shaft 41 is fixed with respect to the arms 39 by any suitable means as by nuts 42 on the ends of the shaft.

In operation of the vehicle, the reaction arms 23 and 24 and thereby the cylinder 19 for each of the bogie wheels 14 are held fixed with respect to the body 10 and wall portions 17 and 18 by means of a screw 25. The arms 39 between which each of the wheels 14 is mounted are fixed with respect to a cylinder 32 and thereby the associated cylinder 28, and the pressure which is on the wheel 14, constituting that part of the weight of the vehicle supported by the wheel, is taken by the rubber member 29 between the cylinders 32 and 28 which is thereby under torsional stress. The torsion members 29 of the individual wheels 14 yield as necessary to maintain the tracks 11 in contact with uneven surfaces traversed by the vehicle, as is apparent. The proportion of the total weight of the vehicle to be taken by the individual torsion members 29 for individual wheels 14 may be adjusted by adjusting the screws 25.

The bogie wheels 15 are also yieldingly and swingingly mounted with respect to the body 10. These bogie wheels preferably act, however, with less force on the tracks 11 than the bogie wheels 14. The suspension for each of the wheels 15 may be similar to the suspension for each of the bogie wheels 14 with the exception that a rubber torsion member 29 of less length is provided, or the suspension for a bogie wheel 15 may include a steel spring, instead of a rubber torsion member, fixed between two concentric cylinders, such as is disclosed in a co-pending application of Benjamin A. Swennes, Serial No. 510,296, filed November 15, 1943. The bogie wheels 15 function, as is apparent, to absorb shocks due to bumps or high portions of terrain encountered by the vehicle.

Each of the yielding suspensions for the bogie wheels 14 may be assembled by permitting the outer cylinder 32 to be somewhat sprung open due to the inherent resiliency of the cylinder with the bolts 38 removed. With the outer cylinder 32 in this condition, the torsion member assembly including the rubber member 29 and the cylinders 19 and 28 may be easily moved inside the cylinder 32. The key 36 and spacer 37 are then put in their proper places in the slots 33 and 31 respectively, the bolts 38 are inserted through the openings in the flanges 34 and 35 and key 36, and the bolts 38 are tightened to bring the flanges and key together substantially as shown in Fig. 4. The cylinder 28 is thereby contracted whereby the open ends of the cylinder halves 28a and 28b are moved together to be closely adjacent to or in contact with the parts 37 and 36, and the rubber member 29 is compressed between the cylinders 28 and 19.

The illustrated bogie wheel suspension assembly is advantageously made up principally of sheet metal parts which may be formed in suitable presses, and the assembly may thus be manufactured quite economically in comparison with an assembly of cast members each of which in general must be machined. The assembly as a whole is furthermore quite light in weight compared to an assembly comprising cast metal parts, and the sheet metal arms 39 in particular are very light in weight compared with cast metal arms used for the same purpose. Lightness is a desirable quality in connection with an amphibian vehicle as has hereinbefore been explained. The bogie wheel suspension construction may be easily assembled so as to put the rubber torsion member 29 in compressed condition, as has been described. The construction for fixing the intermediate cylinder 28 and the outer cylinder 32 against relative rotation and including the key 36 extending into a split in the cylinder 28 is furthermore an effective and simple construction for accomplishing this purpose.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In combination, a body to be supported, a support for said body, a torsion joint comprising two members resiliently joined together for relative movement, one of said members being connected with said support and the other of said two members being fixed with respect to said body, means to secure said other member against rotation relatively to said body, and means for supporting the torsion joint by the body, said means comprising a pair of bearing members having one of their respective ends passed through portions of said body and detachably secured in one of the two members of said torsion joint, whereby said torsion joint is easily mounted or demounted.

2. In a vehicle, in combination, a vehicle body to be movably supported, a support for said body, said support including a wheel, a torsion joint comprising inner and outer cylindrical members radially spaced apart and adapted to be relatively movable with respect to one another by reason of a resilient member which interconnects them, one of said cylindrical members being connected with said support to support the wheel for rotation and the other cylindrical member being fixed with respect to said body, means to secure said other member against rotation relatively to said body, and means for supporting the torsion joint by the body, said means comprising a pair of bolt-like members having one of their respective ends passed through portions of said body and detachably secured in one of said two cylindrical members, whereby said torsion joint is easily mounted or demounted.

3. In a vehicle, in combination, a vehicle body to be movably supported, a support for said body, said support including a wheel, a torsion joint which comprises an inner cylinder, an outer cylinder disposed about and spaced from the inner cylinder and connected with said support to support the wheel for rotation, said cylinders being resiliently joined together for relative movement, end members secured in the open ends of the inner of said cylinders, and means for supporting the torsion joint by said body, said means comprising an arm on each end member adjustably secured at its end to said body and a boltlike member axially mounted in each end of said inner cylinder rotatably securing each of said end members to a portion of said body.

4. In a vehicle, in combination, a vehicle body to be movably supported and having a plurality of opposed wall sections, a support for said body, said support including a wheel, a torsion joint which comprises an inner cylinder fixed with respect to the body and having end members secured in its open ends, an intermediate cylinder disposed about and spaced from said inner cylinder and having at least one longitudinal split therein, a torsion member of yielding material disposed between and fixed to said cylinders, an outer cylinder having a single longitudinal split permitting it to be fitted over said intermediate cylinder, flanges along the split edges of said outer cylinder, a key disposed between said flanges and extending into the split in said intermediate cylinder for fixing the outer and intermediate cylinders against relative rotation, a plurality of bolts extending through the flanges and said key for holding in contracted condition the outer cylinder, said outer cylinder being connected with said support, and means for supporting the torsion joint by said body, said means comprising an arm on each end member adjustably secured at its end to said body against rotation of said inner member relative to said body and a pair of bolts each of which bolts is having one end journaled in a wall section of said body and the other end detachably secured in an end member of said inner cylinder, whereby said torsion joint is easily mounted or demounted.

5. In a vehicle, in combination, a vehicle body to be movably supported and having a plurality of opposed wall sections, a support for said body, said support including a wheel, a torsion joint which comprises an inner cylinder fixed with respect to the body and having end members secured in its open ends, said end members each having an arm adjustably secured at its end to said body against rotation of said end member with respect to said body, an intermediate cylinder disposed about and spaced from said inner cylinder and having two longitudinal splits therein, a torsion member of yielding material disposed between and fixed to said cylinders, an outer cylinder having a single longitudinal split permitting it to be fitted over said intermediate cylinder, a spacer adapted to be disposed in one of the splits in said intermediate cylinder, flanges along the split edges of said outer cylinder, a key disposed between said flanges and extending into the other of said two splits in said intermediate cylinder for fixing the outer and intermediate cylinders against relative rotation, a plurality of bolts extending through the flanges and said key for holding in contracted condition the outer cylinder, said outer cylinder being connected with said support, and means for supporting the torsion joint by said body, said means comprising a pair of bolts each of which bolts is having one end journaled in a wall section of said body and the other end detachably secured in an end member axial of said inner cylinder, whereby said torsion joint is easily mounted or demounted.

CARL E. SWENSON.

REFERENCES CITED

The following references are of record in the file of this patent:

UNITED STATES PATENTS

| Number | Name | Date |
|---|---|---|
| 1,393,157 | Ollivier | Oct. 11, 1921 |
| 1,710,809 | Broadwell | Apr. 30, 1929 |
| 1,836,446 | Christie | Dec. 15, 1931 |
| 1,993,260 | Burns | Mar. 5, 1935 |
| 2,149,297 | Knox | Mar. 7, 1939 |
| 2,162,198 | Herrington | June 13, 1939 |
| 2,191,211 | Krotz | Feb. 20, 1940 |
| 2,226,406 | Krotz | Dec. 24, 1940 |
| 2,286,609 | Ledwinka | June 16, 1942 |
| 2,345,201 | Krotz | Mar. 28, 1944 |

FOREIGN PATENTS

| Number | Country | Date |
|---|---|---|
| 47,160 | France | Nov. 7, 1936 |